(No Model.)

H. L. DULL.
ASH PAIL.

No. 417,816. Patented Dec. 24, 1889.

WITNESSES:
INVENTOR: Hannah L. Dull
BY John A. Wiedersheim
ATTORNEY.

UNITED STATES PATENT OFFICE.

HANNAH L. DULL, OF PHILADELPHIA, PENNSYLVANIA.

ASH-PAIL.

SPECIFICATION forming part of Letters Patent No. 417,816, dated December 24, 1889.

Application filed June 21, 1889. Serial No. 315,043. (No model.)

*To all whom it may concern:*

Be it known that I, HANNAH L. DULL, a citizen of the United States, residing in the city and county of Philadelphia, State of Pennsylvania, have invented a new and useful Improvement in Ash Pails and Sifters or Screens, which improvement is fully set forth in the following specification and accompanying drawings.

My invention relates to improvements in ash pails and sifters; and it consists of the construction and combination of parts as herein set forth and claimed.

Figure 1:
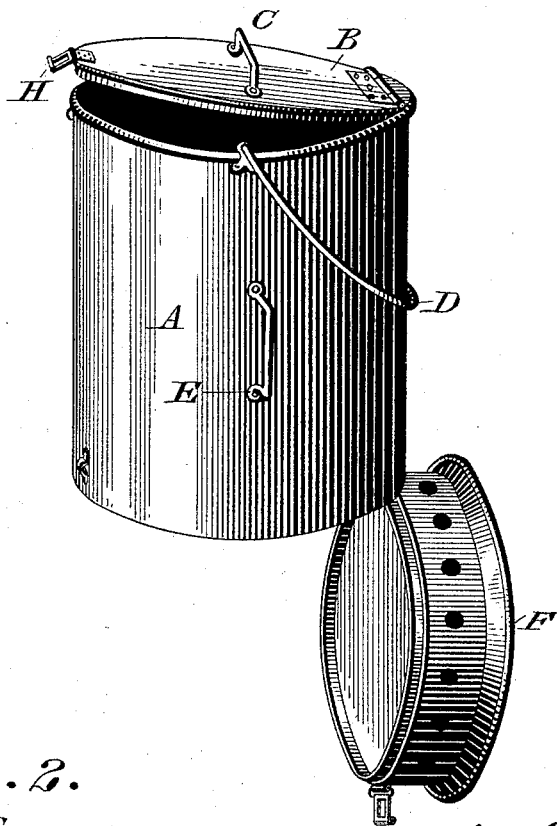
Figure 2:
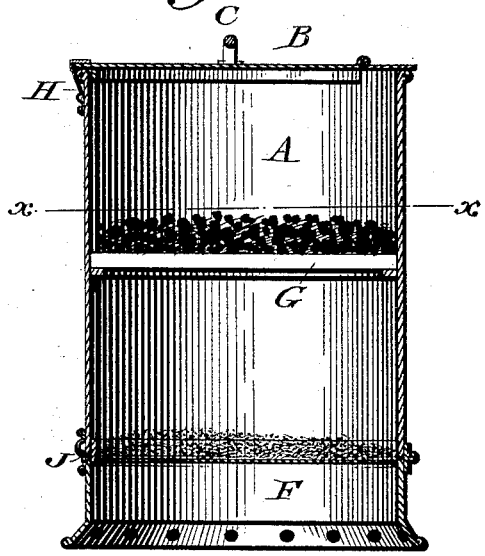
Figure 3:
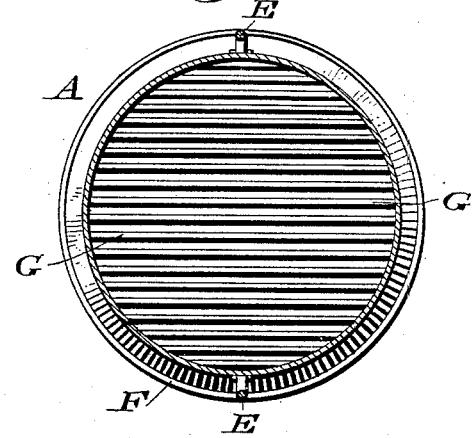

Figure 1 represents a perspective view of the device embodying my invention. Fig. 2 represents a transverse vertical section thereof. Fig. 3 represents a horizontal section thereof on the line $x\,x$, Fig. 2.

Similar letters of reference indicate corresponding parts in the three figures.

Referring to the drawings, A designates a pail or vessel, preferably formed of metal, and provided with a hinged lid B, having a handle C, a bail D, side grips E, a hinged bottom F, and an interiorly-arranged screen or grate G. The handle C is mounted at about the center of the lid, and the side grips are secured nearer the bottom of the body. The bottom F is hinged to one side of the lower edge of the body and provided with a perforated rim, which forms a base-rest, and also prevents the transmission of heat to the floor.

The screen or grate is located at a suitable elevation in the pail, and consists preferably of a series of parallel bars arranged at or about the same distance apart as the bars of a stove-grate, whereby the cinders and coal may be used directly from the pail without further manipulation.

The lid is raised by the handle C and the ashes are introduced into the pail, after which the said lid is closed and fastened by the catch H. The pail is now raised by the lower side grips E, and held in an upright position and reciprocated vertically or laterally. The ashes fall on the bottom F, after which said bottom is unfastened and drops to one side, as shown in Fig. 1, allowing discharge of the ashes from the pail. The bottom is afterward closed and secured by the catch J.

The cinders and coal may be removed at the top of the pail and the latter is ready for further use.

Having thus described my invention, what I claim as new, and desire to secure by Letters Patent, is—

1. An ash pail and sifter having a body with a grate therein, a hinged lid with a handle thereon, a hinged bottom forming an ash-receptacle and provided with a perforated rim, and side grips secured to said body, said parts being combined substantially as described.

2. An ash pail and sifter consisting of the body A, with a bail D and side grips E thereon, the latter secured on the sides thereof, the hinged lid B, with the handle C, the hinged bottom F, having a rim forming a base-rest, a grate within the body portion, and catches for securing said lid and bottom in closed position, said parts being combined substantially as described.

HANNAH L. DULL.

Witnesses:
JOHN A. WIEDERSHEIM,
JAMES F. KELLY.